United States Patent
Yellepeddy et al.

(10) Patent No.: US 8,091,138 B2
(45) Date of Patent: Jan. 3, 2012

(54) METHOD AND APPARATUS FOR CONTROLLING THE PRESENTATION OF CONFIDENTIAL CONTENT

(75) Inventors: Krishna Kishore Yellepeddy, Austin, TX (US); Conrad James Johnson, Pflugerville, TX (US); Helen McKinstry, Marble Falls, TX (US); Perry Lee Statham, Round Rock, TX (US); Sandra Lee Tipton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/851,224

(22) Filed: Sep. 6, 2007

(65) Prior Publication Data
US 2009/0070881 A1  Mar. 12, 2009

(51) Int. Cl.
| | |
|---|---|
| G06F 17/00 | (2006.01) |
| G06F 7/04 | (2006.01) |
| G06F 17/30 | (2006.01) |
| G06Q 30/00 | (2006.01) |
| H04K 1/00 | (2006.01) |
| G06F 21/00 | (2006.01) |
| G06F 21/24 | (2006.01) |
| H04L 9/08 | (2006.01) |
| H04L 9/32 | (2006.01) |
| G06Q 99/00 | (2006.01) |

(52) U.S. Cl. ............ 726/26; 726/1; 726/3; 726/28; 705/14.27; 705/14.52; 380/28

(58) Field of Classification Search ............ 726/26, 726/28, 3, 1; 705/14.27, 14.52; 380/28
See application file for complete search history.

(56) References Cited

U.S. PATENT DOCUMENTS

| | | | |
|---|---|---|---|
| 6,172,664 B1 | 1/2001 | Nakasuji et al. | |
| 7,555,769 B1 * | 6/2009 | Shapiro et al. | 726/1 |
| 7,802,305 B1 * | 9/2010 | Leeds | 726/26 |
| 2005/0125673 A1 | 6/2005 | Cheng et al. | |
| 2006/0240771 A1 | 10/2006 | Graves et al. | |
| 2007/0027732 A1 | 2/2007 | Hudgens | |
| 2008/0072290 A1 * | 3/2008 | Metzer et al. | 726/3 |
| 2009/0019553 A1 * | 1/2009 | Narayanaswami | 726/28 |

FOREIGN PATENT DOCUMENTS

WO  WO 2010137047 A1 * 12/2010

OTHER PUBLICATIONS

Sergej Zerr, Wolfgang Nejdl; "Privacy preserving document indexing infrastructure for a distributed environment"; Aug. 2008; Proceedings of the VLDB Endowment, vol. 1 Issue 2; Publisher: VLDB Endowment; pp. 1638-1643.*

* cited by examiner

Primary Examiner — Eleni Shiferaw
Assistant Examiner — Courtney Fields
(74) Attorney, Agent, or Firm — Yee & Associates, P.C.; Jeffrey S. LaBaw

(57) ABSTRACT

A computer implemented method and apparatus for controlling the presentation of information. In response to receiving a request to present the information, a process confirms that conditions for presentation of the information are satisfied using a set of presentation policies, wherein the conditions are specified in the set of presentation policies, and wherein the conditions comprise a status of a user and a setting of the user. The process then determines whether confidential content is present in the information. Responsive to the confidential content being present, the process redacts the confidential content before presenting the information to a user, and then updates a presentation history with metadata describing the presentation of the information comprising the confidential content.

17 Claims, 3 Drawing Sheets

METHOD AND APPARATUS FOR CONTROLLING THE PRESENTATION OF CONFIDENTIAL CONTENT

BACKGROUND OF THE INVENTION

1. Field of the Invention

The present invention relates generally to an improved data processing system, and in particular to a computer implemented method and apparatus for managing information. Still more particularly, the present invention relates to a computer implemented method, apparatus, and computer usable program product for controlling the presentation of confidential content.

2. Description of the Related Art

Documents, recordings, or other forms of media containing confidential information may be viewed on a user's computing device. Confidential information is information that is private, personal, or otherwise unsuitable for dissemination to the public. For example, confidential information may include trade secrets, user account information, credit card numbers, credit reports, or any other similar type of information. Confidential information may be viewed in public areas, such as in a coffee shop, a waiting room, an airport, or on an airplane. In some instances, the viewing of confidential information is subject to strict company policies or procedures that are ignored because of time constraints, a blatant disregard for procedures, or inattentiveness. Consequently, confidential information may be inadvertently disseminated to people having malicious intentions. For example, corporate trade secrets may be obtained by competitors, user's identity may be stolen, or embarrassing details of a user's personal life may be discovered.

Currently used methods for protecting the display of confidential information include implementing physical components or devices. For example, privacy screens are sometimes applied to laptop monitors or other mobile devices to prevent a third party from viewing information displayed on a laptop monitor. The privacy screens allow only the user sitting directly in front of the laptop to view the presented information. This method, however, does not prevent third parties from viewing the confidential information if the user steps away from the laptop. Further, use of the privacy screen may give the user a false sense of security, thereby decreasing the user's vigilance against potentially malicious behavior.

Another currently used method for restricting access to confidential information is to limit the display of information based upon a location of the user. Thus, if the user is in a trusted location, such as the user's office, then the user may access the confidential content. However, this may be insufficient means of protection. For example, if a user is at the office, a trusted location, but is negotiating a contract with third parties, then confidential content may still be presented despite the fact that the user is in a trusted location. Furthermore, this method of restricting the presentation of confidential information may deny a user the ability to receive certain information without exception, even if the receipt of confidential information is preferred, necessary, or advantageous.

Thus, the currently used methods for limiting the display of confidential information may not offer sufficient protection against the inadvertent display of confidential information. Additional safeguards may be necessary to fully protect confidential information. Furthermore, the use of existing safeguards may prevent a user from receiving a presentation of confidential information even if the presentation of confidential information is desired, necessary, or beneficial.

SUMMARY OF THE INVENTION

The illustrative embodiments described herein provide a computer implemented method, apparatus, and computer usable program product for controlling the presentation of information. In response to receiving a request to present the information, a process confirms that conditions for presentation of the information are satisfied using a set of presentation policies, wherein the conditions are specified in the set of presentation policies, and wherein the conditions comprise a status of a user and a setting of the user. The process then determines whether confidential content is present in the information. Responsive to the confidential content being present, the process redacts the confidential content before presenting the information to a user, and then updates a presentation history with metadata describing the presentation of the information comprising the confidential content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
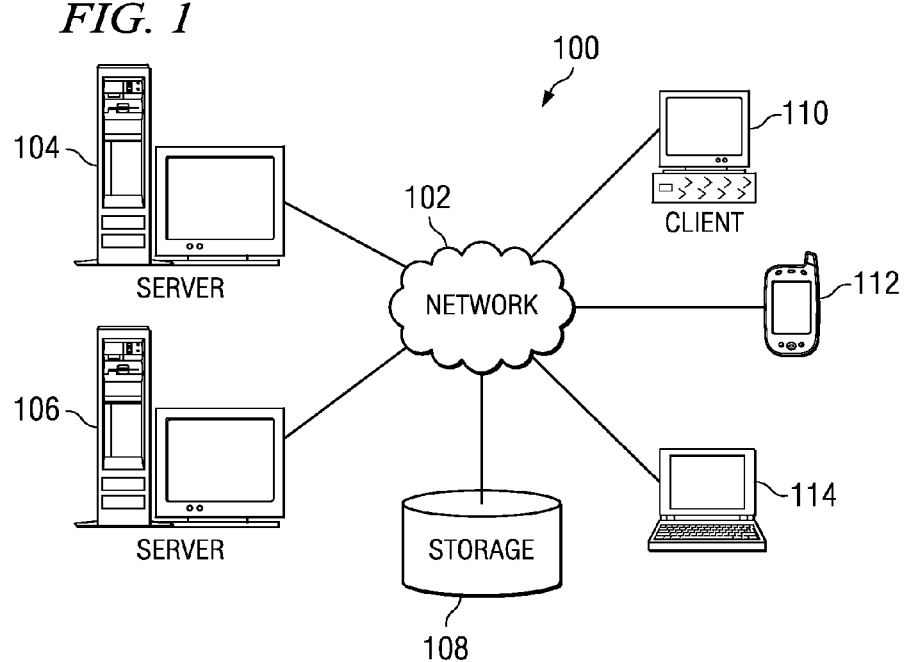
FIG. 1 is a pictorial representation of a network data processing system in which illustrative embodiments may be implemented.
Figure 2:
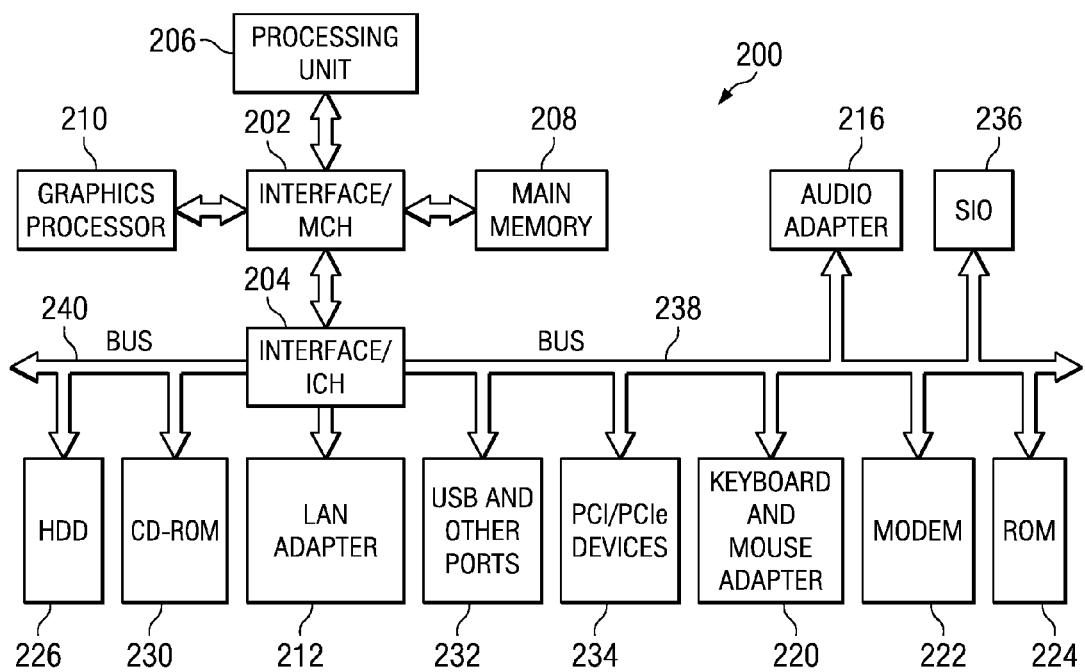
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, client 110, personal digital assistant (PDA) 112, and laptop 114 connect to network 102. Client 110 may be, for example, personal computers or network computers. In the depicted example, server 104 provides data, such as boot files, operating system images, and applications to client 110, personal digital assistant (PDA) 112, and laptop 114. Client 110, personal digital assistant (PDA) 112, and laptop 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a personal digital assistant.

The illustrative embodiments described herein provide a computer implemented method, apparatus, and computer usable program product for controlling the presentation of information. In response to receiving a request to present the information, a process confirms that conditions for presentation of the information are satisfied using a set of presentation policies, wherein the conditions are specified in the set of presentation policies, and wherein the conditions comprise a status of a user and a setting of the user. Either before or after confirming that conditions for presentation of the information are satisfied, the process determines whether confidential content is present in the information. Responsive to the confidential content being present, the process redacts the confidential content before presenting the information to a user, and then updates a presentation history with metadata describing the presentation of the information comprising the confidential content.

The presentation of confidential content may be controlled by implementing a set of user-defined presentation policies. The set of presentation policies is one or more policies specifying conditions that must exist before confidential content is presented to a user. In addition, the set of presentation policies may define the type of information that is confidential content and define the manner in which confidential content may be presented. For example, the set of presentation policies may define a status of a user and a setting of the user as conditions which must be satisfied before confidential content may be presented to the user. Other conditions that may be defined by the set of presentation policies may include at least one of a date, a time, and a type of device. Thus, the conditions may be either a date, a time, a type of device, or any combination of the three.

For example, the set of presentation policies may restrict the presentation of information to a user because the user is unavailable, because the information is confidential, because the user lacks the requisite authority to view the confidential content, because the user is not in a secured setting, because the user is operating a type of computing device, or any other condition or criteria. Thus, the set of presentation policies may dictate that a company's payroll information is confidential, that the payroll information may only be presented to the human resources director, and that it may only be presented to the human resources director either at the office or home of the human resources director.

Figure 3:
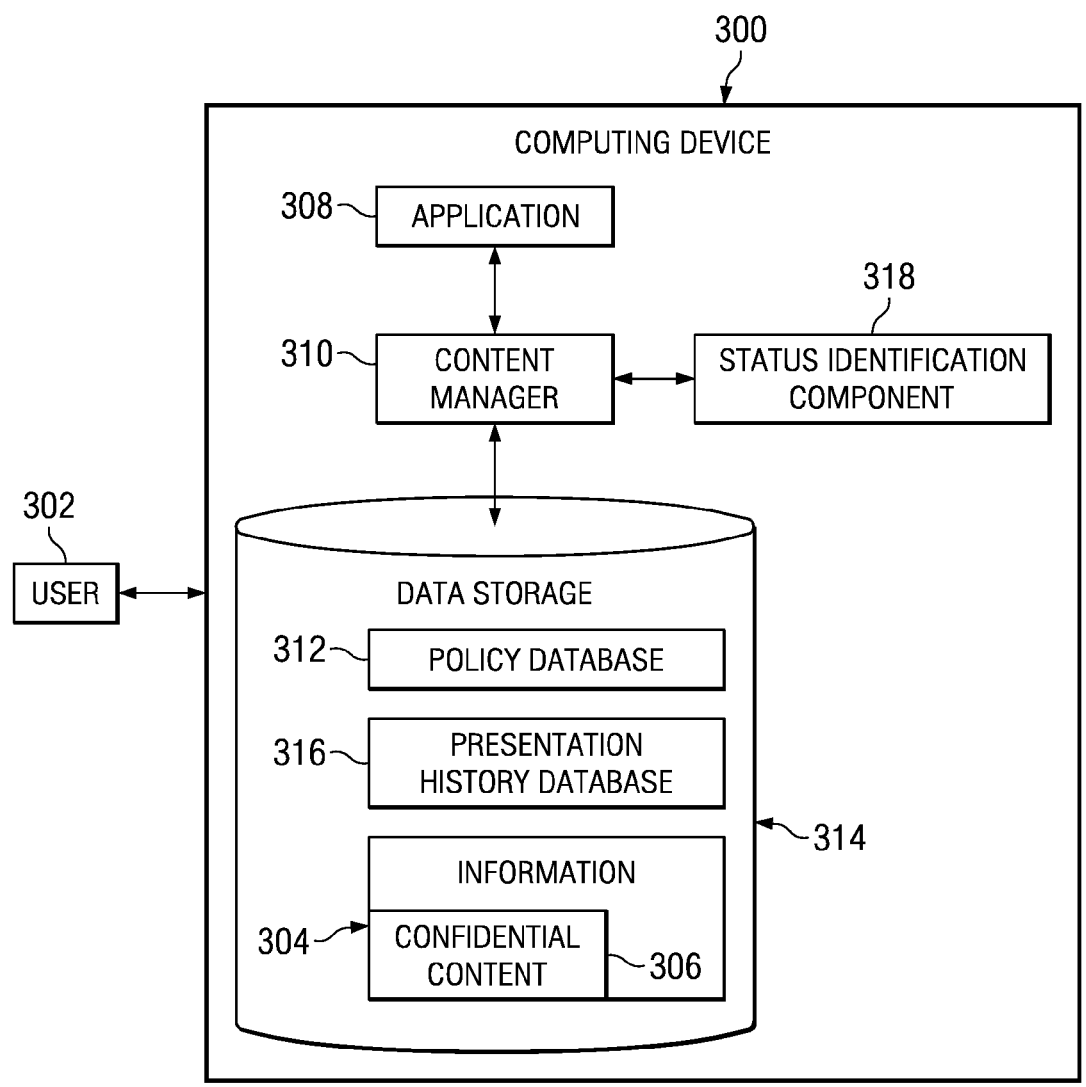
FIG. 3 is a diagram of a computing device for use in controlling the presentation of information in accordance with an illustrative embodiment.

Turning now to FIG. 3, a diagram of a computing device for use in restricting access to confidential content is depicted in accordance with an illustrative embodiment. Computing device 300 is a computing device, such as client 110, personal digital assistant (PDA) 112 and laptop 114 in FIG. 1, which is operable by user 302 for accessing information 304.

Information 304 is any type of information that may be accessed and presented by computing device 300. For example, information 304 may be the information contained within a document, presentation, email, instant message, audio recording, or video recording. Information 304 may be accessed by user 302 via webpage, instant messenger, document, file, spreadsheet, audio recording, or any other manner. Information 304 may include confidential content 306. Confidential content 306 is information or data contained within information 304 which is deemed to be confidential by the creator of the data, a recipient of the data, by an organizational policy, a law, or any other person, policy, or source.

For example, information 304 may be a memorandum generated on a word processing application and confidential content 306 may be confidential settlement information or attorney work product. Information 304 may also be a presentation containing confidential content 306, which is a business strategy for a product launch. In another example, information 304 may be a spreadsheet containing confidential customer account information. Similarly, information 304 may include an email or instant message containing confidential content 306, in this case, information deemed personal by the participants to the communication. Further, information 304 may be a voice recording or telephone conversation regarding confidential content, such as a user's medical history.

User 302 operates computing device 300 to access information 304 which may contain confidential content 306. In particular, user 302 manipulates computing device 300 to enable user 302 to interact with application 308 to access information 304. Application 308 is a software application, which may be loaded onto or otherwise accessed by computing device 300. Application 308 may be, for example, an email application, a word processing application, an instant messenger application, a presentation application, a spreadsheet application, or any other application currently available or later developed.

In this example, application 308 is interfaced with content manager 310. Content manager 310 is a software application that governs the presentation of information 304 having confidential content 306 on a computing device, such as computing device 300. Content manager 310 monitors requests to present information 304 and confirms that the presentation of information 304 having confidential content 306 is permissible in light of conditions specified in a set of presentation policies.

Conditions that may be specified by the set of presentation policies may include, without limitation, the status of a user, a setting of the user, a date, a time, and a type of device. The status of a user is a user's status. In particular, the status of the user is at least one of an authority of the user and an availability of the user. In other words, the status of the user may be either the user's availability, an authority of the user, or both. The user's availability may be determined by the user, as the authority of the user, the availability of the user, or both the authority of the user and the availability of the user.

The availability of the user is the ability of the user to receive information. A user may be available and thus capable of receiving information, or unavailable and incapable of receiving information. The availability of the user may be set by the user, or automatically in accordance with conditions set forth in the set of presentation policies. For example, a user operating an instant messaging application may manually set the user's status to unavailable to prevent the delivery of information. Similarly, the user may configure an email application to notify senders of information that the user is unavailable because the user is out of town and incapable of receiving information.

In addition, the user's availability may be determined automatically. For example, an instant messaging application may automatically designate a user as unavailable if the user has not interacted with the instant messaging application within a predefined period of time. Additionally, the user's status may be set automatically relative to existing conditions. For example, a user may not wish to receive confidential work-related information after working hours. Thus, every day at 5 pm, the user's status may be automatically changed to unavailable.

The status of the user may also be the user's authority to view confidential content. The authority of the user is the right of the user to access and/or view information having confidential content. For example, an owner of a business may have the authority to view all information generated during the course of running the business despite the fact that such information may include confidential payroll data. A lower-level manager, however, may lack the authority to review the confidential payroll data because that manager lacks the requisite level of authority to review such information.

A setting of the user is the surroundings or environment of the user and is not limited only to the user's location. The setting may include, for example a location, people in the vicinity of the user's location, an audience of a selected presentation, a time of day, a day of the week, or any other condition. Confidential information may be presented to a user in a secured setting. A secured setting is a setting defined by a set of presentation policies. In particular, a secured setting is defined by setting forth the acceptable conditions that must exist or must not exist before confidential content may be presented to a user. For example, a user requesting information having confidential content may receive that information in its entirety if the user is alone in the user's office. In this example, the set of presentation policies identifies the user's office as a secured setting if no other people are present. If, however, the user is having a meeting with another person, then the setting is, according to this presentation policy, unsecured. Consequently, the confidential content cannot be produced to the user.

Further, the set of presentation policies may specify that information relating to a particular subject matter may only be presented to a particular user when the user is available and located at a secured location. In addition, the set of presentation policies may require that the user operate a particular device type, that the information lack a confidentiality designation, that any prospective audience is authorized to view the information, or any other condition which may be relevant to controlling the presentation of information.

Content manager 310 confirms that the presentation of information 304 having confidential content 306 is permissible by referencing a set of presentation policies to determine whether the specified conditions for presentation have been satisfied. The set of presentation policies are stored in policy database 312. Policy database 312 is a database configured for storing a set of presentation policies.

The databases depicted in FIG. 3, which include policy database 312, may be any form of structured collection of records or data. The databases may be, for example, a spreadsheet, a table, a relational database, a hierarchical database, or the like. A database also may be an application that manages access to a collection of data. The databases may be stored in data storage 314 or in the operating memory of the data processing system, externally on a secondary data storage device, locally on a recordable medium such as a hard drive, floppy drive, CD ROM, DVD device, remotely on a storage area network, such as storage 108 in FIG. 1, or in any other type of storage device.

The set of presentation policies may define data as confidential according to any type of criteria that may be associated with confidential content. For example, the set of presentation policies may specify as confidential any data incorporated into a particular type of file or document, pertaining to a particular subject matter, or data associated with a particular author. These criteria may be defined upon creation of information 304, or sometime thereafter.

A portion of information 304 may be designated as confidential by the author or recipient of information 304. This designation forms confidential content 306. For example, if information 304 is a document, spreadsheet, presentation, email, web page, instant message, voice recording, video, or similar form of communication, then the author of the communication may designate a paragraph, a slide, a particular message, or a portion of information 304 as confidential to form confidential content 306. Thus, if user 302 uses application 308 to generate information 304, which is a confidential presentation in this example, user 302 may select a menu option in application 308 to designate a portion of information 304 as confidential content 306. Alternatively, content manager 310 may include a graphical user interface operable by user 302 to designate portions of information 304 as confidential content 306. Portions of information 304 that may be designated as confidential may be one or more portions of information 304, or the entire portion of information 304.

In an illustrative embodiment, content manager 310 determines that confidential content 306 is present in information 304 by detecting a confidential designation of information 304. A confidential designation is an indicator that is associated with confidential content 306. The indicator may be manually generated and associated with confidential content 306 by a user, such as an author or recipient of information 304 having confidential content 306. The indicator may be embedded within information 304 having confidential content 306, or the confidential designation indicator may be stored separately from information 304. For example, if the indicator is stored separately from information 304, the indicator may be stored in a database identifying information, by filename and location, having confidential content. In this manner, content manager 310 may reference the database in response to receiving a request to present information.

For example, an author drafting a confidential memo may select an option in a word processing application designating the memo as confidential. Additionally, the author of the memo may type in a word or phrase, such as "confidential information," in a header or footer that is recognizable by content manager 310. A confidential designation may be embedded in the memo by the word processing application or by the author or recipient of the memo. In addition, content manager 310 or the word processing application may generate an entry for storage in a database identifying the memo as confidential.

In addition, content manager 310 may automatically generate a confidential designation of information 304 having confidential content 306 if content manager 310 determines that confidential content, such as confidential content 306, is present in information 304. This automatic detection provides additional protection in the event that the creator of information 304 inadvertently failed to designate information 304 as containing confidential content, or if the information becomes confidential after creation. Content manager 310 may determine that confidential content 306 is present in information 304 by first identifying the content of information 304. Content manager 310 may identify the content of information 304 by performing a keyword search of information 304, identifying the author of information 304, or analyzing any other characteristic of information 304 that may enable content manager 310 to identify the content of information 304.

Next, the content identified by content manager 310 is compared to data stored within presentation history database 316. Presentation history database 316 is a database configured to store data and metadata describing the types and content of confidential content that has been previously presented or withheld. In addition, presentation history database 316 may also store data describing the conditions associated with the confidential content at the time the information was either presented or withheld.

For example, the data stored in presentation history database 316 may include data describing a subject matter of confidential content, the author or recipient of the confidential content, conditions existing at the date and time the confidential content was presented, the type of device upon which the confidential content was presented, and any other information relevant to the presentation of the confidential content.

Thus, for example, if content manager 310 identifies information 304 as originating from the payroll department, but information 304 does not contain a confidential designation, then content manager 310 may automatically designate information 304 as confidential or containing confidential content 306. In particular, content manager 310 may make this designation by identifying that information 304 originated from the payroll department, then searching presentation history database 316 to determine that information originating from the payroll department has always been designated confidential in the past.

The presentation history is stored in presentation history database 316 and continually updated as confidential content is presented to users, such as user 302. Thus, each instance that a user requests information containing confidential content, content manager 310 updates the presentation history in presentation history database 316 with metadata describing whether the confidential content was presented and the conditions existing at the time the request was made.

Consequently, if an author inadvertently disseminates information containing confidential content without designating the information or data as confidential, then content manager 310 may notify a recipient of the information that the information may contain confidential content. Content manager 310 may then prompt the recipient for permission to present the potentially confidential content before presentation. Thereafter, content manager 310 updates presentation history database 316 to maintain an up-to-date record for use in identifying confidential content.

For example, if payroll information on a spreadsheet was always deemed confidential and restricted from presentation, then an email which was not designated as confidential may be flagged as potentially confidential. Before presenting the email, content manager 310 may provide to user 302 a prompt identifying that the email may contain confidential content. Thereafter, content manager 310 may require user 302 to provide the required permission before presenting the email.

The set of presentation policies may set forth certain conditions that must exist or must be satisfied before content manager 310 may present information 304 with confidential content 306 to a user. These conditions are circumstances or events that may change from each instance of viewing information 304 with confidential content 306. These conditions may include, for example, a current physical location from which information 304 with confidential content 306 is requested, a type of device upon which information 304 is to be displayed, an audience to whom information 304 with confidential content 306 is to be presented, a date, a time of day, or any other similar type of event, circumstance, or condition.

The type of device upon which information 304 with confidential content 306 may be presented is a category of device that can be broadly or narrowly defined. For example, a device type may be separated into two broad descriptive categories: portable and non-portable. Thus, laptops, personal digital assistants, cell phones, tablet personal computers and other computing devices may be categorized as portable computing devices. On the other hand, desktop computers, mainframes, and other similar types of devices not easily moved from one location to another may be categorized as non-portable devices. This distinction between portable and non-portable may be incorporated into the set of presentation policies to control the presentation of information.

For example, the set of presentation policies may permit information 304 to be presented on all devices, portable and non-portable. However, the set of presentation policies may limit the presentation of confidential content 306 to the non-portable computing devices to reduce the likelihood that a passerby might become aware of confidential content 306 within information 304.

In another embodiment, the types of devices may be defined based on a generic classification of the device. Thus, a device may be classified as a laptop, desktop, personal digital assistant, tablet PC, cell phone, or any other commonly known, generic classification. In addition, the types of devices may be defined based upon the various components incorporated in, or attached to, the computing device. For example, one type of device may be defined based on the existence of an overhead projector. In this manner, the set of presentation policies may be created to limit the likelihood that information 304 with confidential content 306 is disseminated to an audience lacking the authority to access such information.

Computing device 300 includes status identification component 318 to detect a user's status and the existing conditions at the time that a request to present information 304 is made. Status identification component 318 is one or more components of computing device 300, coupled to computing device 300, or otherwise accessible to computing device 300.

Depending upon the particular implementation, status identification component 318 may be a software component, a hardware component, or a combination of software and hardware. For example, status identification component 318 may include a global positioning satellite (GPS) device operable to identify a location of computing device 300.

The location information may then be received by content manager 310 to determine whether information 304 with confidential content 306 may be presented to user 302 operating computing device 300. In a similar manner, a location of computing device 300 may also be established with reference to the location of a known network, such as a wireless fidelity (WiFi) network located at an office building or a personal residence. In this example, status identification component 318 may include a network card or similar device and any associated software.

Status identification component 318 may also be a part of an email and calendar application, such as Microsoft® Outlook®, or a separate software application interfacing with the calendar and email application. Thus, if a user, such as user 302, specifies that user 302 will be at a particular location at a given date and/or time or in the company of one or more people, content manager 310 may restrict the presentation of certain forms of information accordingly.

The set of presentation policies may also govern the manner in which information 304 with confidential content 306 may be presented to user 302, if at all. For example, the set of presentation policies may prohibit the presentation of information 304 because information 304 includes confidential content 306. Thus, if information 304 is presented in a webpage, content manager 310 may prevent user 302 from accessing the webpage. Where information 304 is presented to a user in an instant message, then content manager 310 may prevent delivery of the instant message with confidential content 306. In another example, content manager 310 may set a status of user 302 to appear offline, or in a "do not disturb" state.

Alternately, the set of presentation policies may permit the presentation of information 304 provided that confidential content 306 is redacted before information 304 is presented to user 302. Content manager 310 may redact confidential content 306 from information 304 by removing confidential content from information 304 by blacking out, or otherwise obscuring, confidential content 306, or by replacing confidential content 306 with non-confidential content.

In the different illustrative examples, obscuring confidential content 306 means altering the appearance of confidential content 306 so that it cannot be read. For example, blurring out confidential content 306 so that it cannot be read is one method of obscuring confidential content 306. Non-confidential content, on the other hand, may be a statement such as, "confidential" or "redacted", which indicates that confidential content exists but which does not divulge the substance of the confidential content.

For example, if during the course of giving a presentation, user 302 wants to show an audience an attachment from an email message, but one or more email messages include confidential content, then content manager 310 may obscure the email message headers to prevent an inadvertent disclosure of confidential content to the audience. Once user 302 has completed the presentation and is either in a private location, or alone, then content manager 310 may restore the email message headers. Similarly, if a user receives an instant message while unavailable, then content manager 310 may set the user's status to unavailable to prevent disclosure of information that may include confidential content. Information delivered while the user is unavailable is queued and delivered to the user at a later time.

When presented in a webpage, content manager 310 may detect the existence of confidential content 306 when a user, such as user 302, generates a login to access information 304. Alternatively, content manager 310 may detect the existence of confidential content 306 by determining whether a secure connection has been established between application 308, which is a web browser in this example, and a web server. If a secure connection has been established, then content manager 310 may proceed according to the set of security policies, and if requisite permission from user 302 has been granted. Additionally, as previously disclosed above, confidential content 306 within a webpage may be designated as confidential by the webpage author. In particular, the confidential content may be identified by hypertext markup language (HTML) tags or other identifiers embedded in the source code. Thus, upon locating the confidentiality identifiers, content manager 310 can identify confidential content.

In the illustrative example in FIG. 3, content manager 310 is implemented in computing device 300 for controlling the presentation of information to user 302 operating computing device 300. However, in alternate embodiments, content manager 310 may be implemented in a remote computing device for controlling the presentation of information to user 302 operating computing device 300. For example, content manager 310 may be implemented in a remote webpage server for controlling the presentation of information 304 on computing device 300. Thus, referring back to FIG. 1, a content manager may be incorporated in server 104 for controlling the presentation of information to a user operating client 110. In addition, a content manager may be incorporated in both server 104 and client 110 for controlling the presentation of information on client 110. In this manner, a server-based content manager may control the distribution of information to numerous clients.

For example, if server 104 in FIG. 1 provides web pages to clients, such as client 110, personal digital assistant (PDA) 112, and laptop 114 in FIG. 1, a content manager of server 104 may control the distribution of web pages according to a set of presentation policies setting forth the conditions that must exist, or be satisfied, before information is presented to a user on a client device. Thus, the content manager of server 104 may permit the presentation of a web page to client 110 depending upon a location of the client, the user of the client, a time of day, a device type, the existence of peripheral components on client 110, the internet protocol (IP) address from which the request for information originated, or any other condition specified that may be specified in the set of presentation policies.

Although in this example in FIG. 3, data storage 314 contains policy database 312, presentation history database 316, and information 304 is depicted as a component of computing device 300, in an alternate embodiment, data storage 314 is a network storage device, such as storage 108 in FIG. 1.

Figure 4:
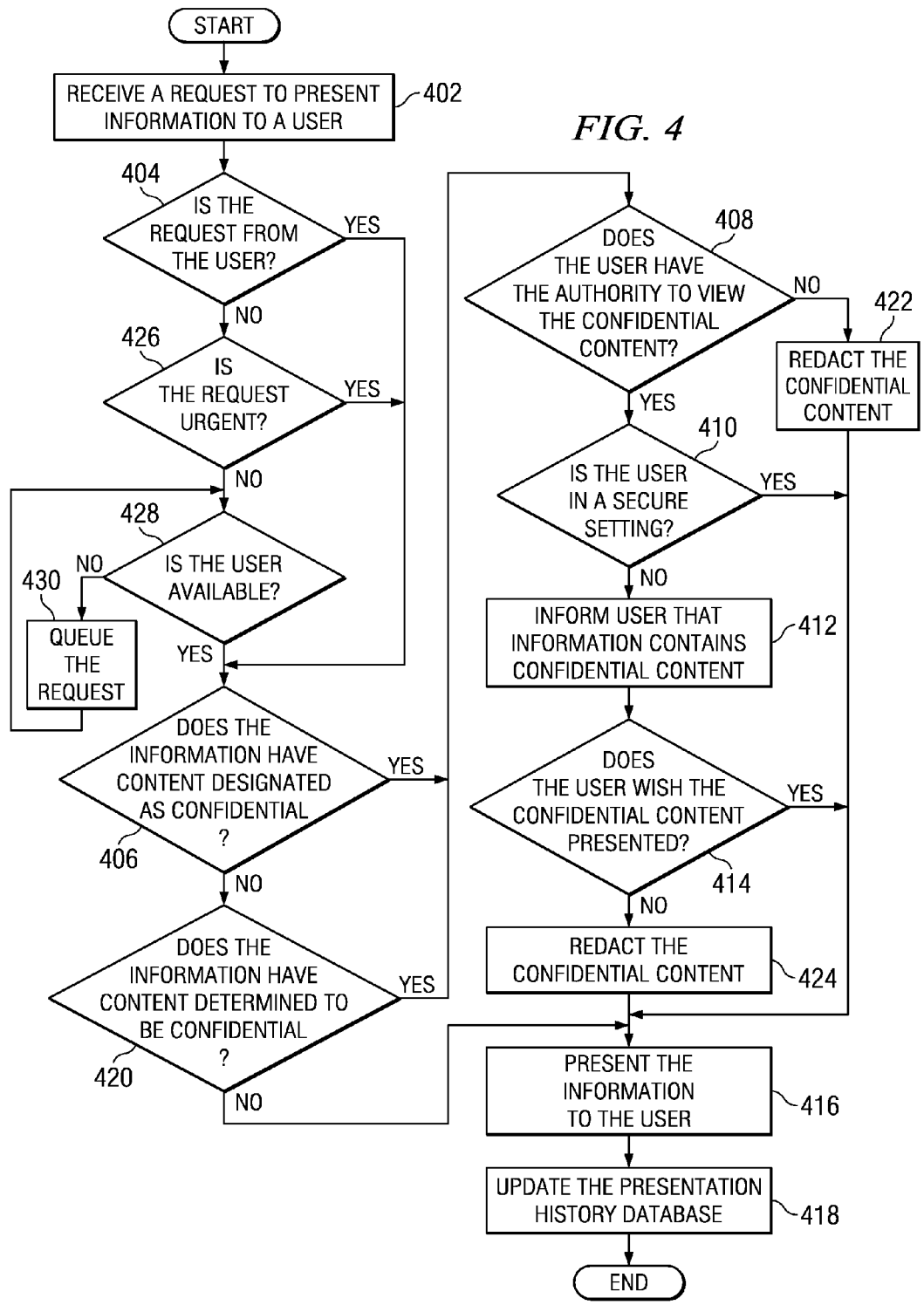
FIG. 4 is a flowchart of a process for controlling the presentation of information in accordance with an illustrative embodiment.

Turning now to FIG. 4, a flowchart of a process for controlling the presentation of information is depicted in accordance with an illustrative embodiment. The process may be performed by a software component, such as content manager 310 in FIG. 3.

The process begins by receiving a request to present information to a user (step 402). The request may originate from the user or from a second party, such as a friend, a co-worker, or a spouse of the user. The process then makes the determination as to whether the request is from the user (step 404). If the process makes the determination that the request is from the user, then the process makes the determination as to whether the information has content designated as confidential (step 406). If the information has content designated as confidential, the process makes the determination as to whether the user has the authority to view the confidential content (step 408).

If the process makes the determination that the user has the authority to view the confidential content, then the process makes the determination as to whether the user is in a secure setting (step 410). In one example, the process may make the determination as to whether the user is in a secure setting by referencing a set of presentation policies setting forth various conditions that may define whether a setting is secure. If the process makes the determination that the user is not in a secure setting, then the process informs the user that the information contains confidential content (step 412). The process then makes the determination as to whether the user wishes to have the confidential content presented (step 414).

If the process makes the determination that the user wishes to have the confidential content displayed, then the process presents the information to the user (step 416). The process then updates the presentation history database (step 418) and terminates thereafter.

Returning now to step 406, if the process makes the determination that the information does not have content designated as confidential, then the process makes the determination as to whether the information has content determined to be confidential (step 420). Portions of the information may be determined to be confidential by comparing the information with data stored in a presentation history database. If the process makes the determination that the information does not have content determined to be confidential, the process continues to step 416. However, if the process makes the determination that the information has content determined to be confidential, then the process returns to step 408.

Returning now to step 408, if the process makes the determination that the user does not have authority to view the confidential content, then the process redacts the confidential content (step 422) and the process continues to step 416.

Returning now to step 410, if the process makes the determination that the user is in a secured setting, then the process presents the information to the user step 416. With reference again to step 414, if the process makes the determination that the user does not wish to have the confidential content presented, then the process redacts the confidential content (step 424) and continues to step 416.

Returning now to step 404, if the process makes the determination that the request is not from the user, the process makes the determination as to whether the request is urgent (step 426). If the process makes the determination that the request is urgent, then the process continues to step 406. However, if the process makes the determination that the request is not urgent, then the process makes the determination as to whether the user is available (step 428). If the process makes the determination that the user is available, then the process continues to step 406. However, if the process makes the determination that the user is not available, then the process queues the request (step 430).

The flowcharts and block diagrams in the different depicted embodiments illustrate the architecture, functionality, and operation of some possible implementations of methods, apparatus, and computer usable program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for controlling the presentation of information. In response to receiving a request to present the information, a process confirms that conditions for presentation of the information are satisfied using a set of presentation policies, wherein the conditions are specified in the set of presentation policies, and wherein the conditions comprise a status of a user and a setting of the user. The process then determines whether confidential content is present in the information. Responsive to the confidential content being present, the process redacts the confidential content before presenting the information to a user, and then updates a presentation history with metadata describing the presentation of the information comprising the confidential content.

Using the method and apparatus described herein, users ignorant of existing security policies or unfamiliar with new policies will be unable to inadvertently, or intentionally, display information with confidential content on a computing device. As a result, the chances that information with confidential content may be disclosed to malicious third parties are decreased. Further, by taking into consideration other conditions, such as the user's status, or a setting of the user, a user can specify the particular instances when the presentation of information is permissible. Moreover, the method and apparatus disclosed above is capable of identifying patterns of presentation to learn from past decisions permitting, or denying, the presentation of information with confidential content. Thus, additional security is available in instances where an explicit security policy may be lacking.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for controlling presentation of information, the computer implemented method comprising:

responsive to receiving a request to present the information, confirming that conditions for presentation of the information are satisfied using a set of presentation policies, wherein the conditions are specified in the set of presentation policies, and wherein the conditions comprise a status of a user and a physical setting of the user;

determining, by a processing unit, whether confidential content is present in the information;

responsive to the confidential content being present, redacting the confidential content before presenting the information to a user; and updating a presentation history with metadata describing the presentation of the information comprising the confidential content.

2. The computer implemented method of claim 1, wherein the status of the user comprises at least one of an authority of the user and an availability of the user.

3. The computer implemented method of claim 1, wherein redacting the confidential content comprises at least one of obscuring the confidential content, removing the confidential content, and replacing the confidential content with non-confidential content.

4. The computer implemented method of claim 1, wherein the determining step further comprises at least one of detecting a confidential designation of the information and comparing a content of the information with the presentation history.

5. The computer implemented method of claim 1, wherein the conditions further comprise at least one of a date, a time, and a type of device.

6. A computer program product comprising:

a non-transitory computer recordable medium including computer usable program code for controlling a presentation of information, the computer program product comprising:

computer usable program code for confirming that conditions for presentation of the information are satisfied using a set of presentation policies, wherein the conditions are specified in the set of presentation policies, and wherein the conditions comprise a status of a user and a physical setting of the user;

computer usable program code for determining whether confidential content is present in the information;

computer usable program code for redacting the confidential content before presenting the information to a user in response to the confidential content being present; and computer usable program code for updating a presentation history with metadata describing the presentation of the information comprising the confidential content.

7. The computer program product of claim 6, wherein the status of the user comprises at least one of an authority of the user and an availability of the user.

8. The computer program product of claim 6, wherein redacting the confidential content comprises at least one of obscuring the confidential content, removing the confidential content, and replacing the confidential content with non-confidential content.

9. The computer program product of claim 6, wherein the determining step further comprises at least one of detecting a confidential designation of the information and comparing a content of the information with the presentation history.

10. The computer program product of claim 6, wherein the conditions further comprise at least one of a date, a time, and a type of device.

11. An apparatus comprising:
a bus system;
a communications system connected to the bus system;
a memory connected to the bus system, wherein the memory includes computer usable program code; and
a processing unit connected to the bus system, wherein the processing unit executes the computer usable program code to confirm, in response to receiving a request to present the information, that conditions for presentation of the information are satisfied using a set of presentation policies, wherein the conditions are specified in the set of presentation policies, and wherein the conditions comprise a status of a user and a physical setting of the user; determines whether confidential content is present in the information; redacts the confidential content before presenting the information to a user in response to the confidential content being present; and updates a presentation history with metadata describing the presentation of the information comprising the confidential content.

12. The computer-implemented method of claim 2, wherein the physical setting of the user comprises surroundings of the user.

13. The computer-implemented method of claim 12, wherein the surroundings of the user comprise people located in a vicinity of the user.

14. The computer-implemented method of claim 13, wherein the conditions comprise a condition that no other people are present with the user.

15. The computer-implemented method of claim 1, wherein the metadata comprises first information for whether the confidential content was presented and second information for the conditions.

16. The computer-implemented method of claim 1, wherein the conditions further comprise a type of device, wherein the type of device is selected from a portable device and a non-portable device.

17. The computer-implemented method of claim 1, further comprising:
responsive to the confidential content being present, determining whether the user wishes to present the confidential content prior to updating the presentation history with the metadata describing the presentation of the information comprising the confidential content.

* * * * *